April 12, 1932. E. O. BARSTOW ET AL 1,853,330
METHOD OF DISTILLING HYDROGEN HALIDES
Filed July 13, 1929 2 Sheets-Sheet 1

Liquid-Vapor Composition Curves for Aqueous Hydrochloric Acid Solutions at Boiling Point INVENTORS
Edwin O. Barstow and
BY Sheldon B. Heath
Thomas Griswold, Jr.
ATTORNEY Patented Apr. 12, 1932

1,853,330

UNITED STATES PATENT OFFICE

EDWIN O. BARSTOW AND SHELDON B. HEATH, OF MIDLAND, MICHIGAN, ASSIGNORS TO THE DOW CHEMICAL COMPANY, OF MIDLAND, MICHIGAN, A CORPORATION OF MICHIGAN

METHOD OF DISTILLING HYDROGEN HALIDES

Application filed July 13, 1929. Serial No. 378,019.

The present invention relates to methods of distilling aqueous solutions of a hydrogen halide, and particularly to the distillation of aqueous hydrochloric acid solutions.

The distillation of such aqueous acids has heretofore presented very serious difficulties owing to their corrosive nature which has limited the choice of structural materials for the apparatus to a narrow range of acid-proof materials usually mechanically weak, easily breakable, and having low conductivity for heat.

It is an object of our invention to provide a method of distillation employing the sensible heat of a hot gaseous current in direct contact with the acid, thus eliminating altogether the transmission of heat through any solid wall with the attendant difficulties and waste of heat. Another object is to enable the distillation to be carried out in a larger, more solid and rigid and less destructible type of apparatus which can be maintained in use for longer periods without need for repair or replacement than has been possible with the forms of apparatus heretofore employed. Our improved method is particularly adapted to large scale operation and may be utilized equally well for distilling a strong acid gas from an aqueous solution thereof or for purifying an acid solution containing non-volatile impurities by simple distillation and condensation, or for concentrating weak acid solutions.

To the accomplishment of the foregoing and related ends, the invention, then, consists of the method hereinafter fully described and particulthly pointed out in the claims, the annexed drawings and the following description setting forth in detail several modes of carrying out the invention, such disclosed modes illustrating, however, but several of various ways in which the principle of the invention may be used.

In said annexed drawings:—

Figure 1:
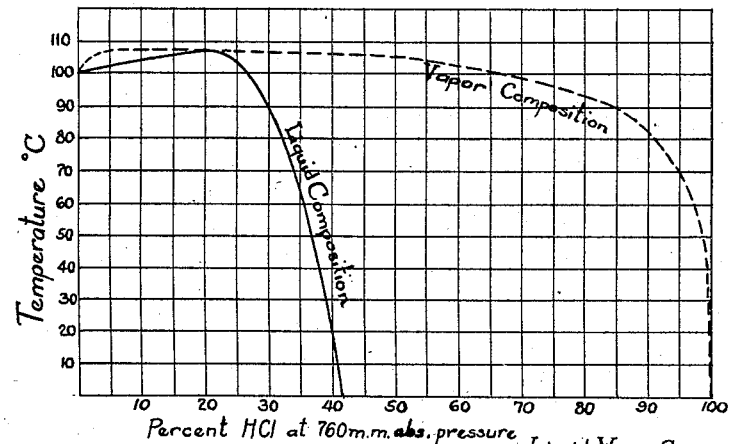
Figure 3:
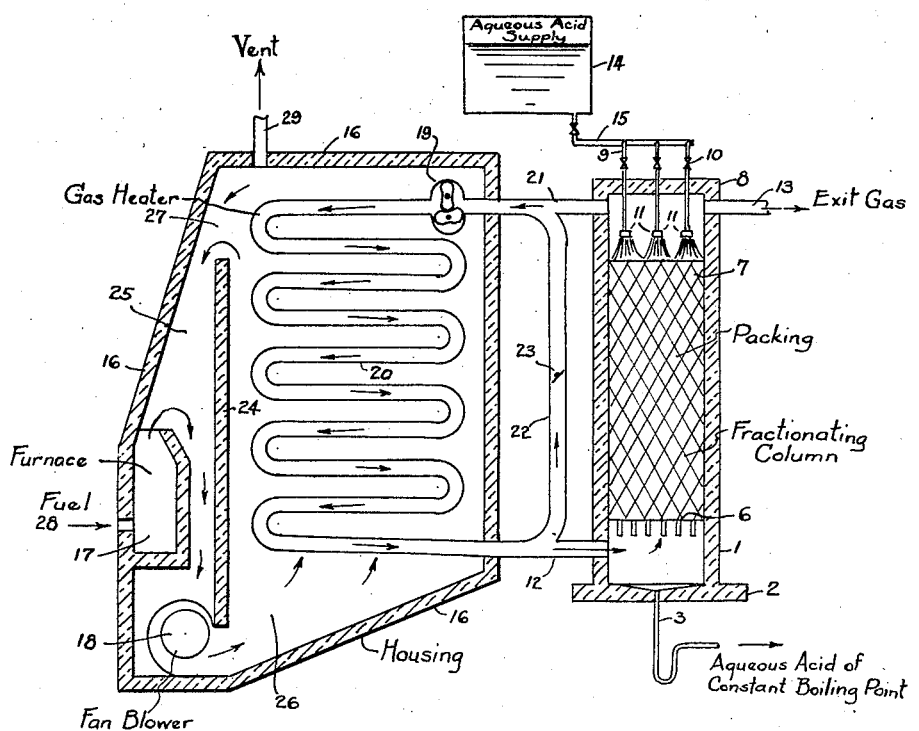
Figure 2:
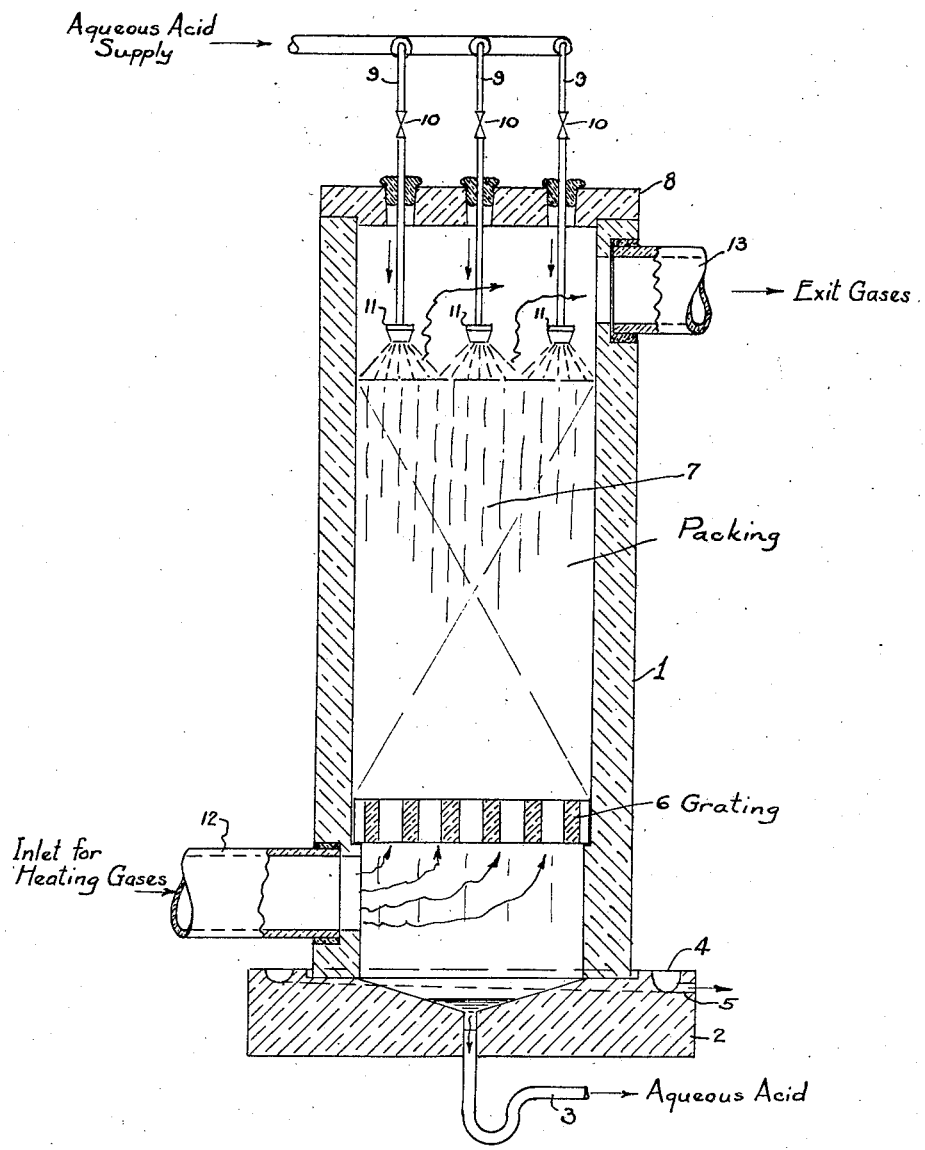

Fig. 1 is a chart showing liquid and vapor composition curves for boiling solutions of hydrochloric acid in water at normal atmospheric pressure, 760 mm. Fig. 2 is a vertical cross section of a distillation column of general applicability. Fig. 3 is a cross section of a modified arrangement employing a like column together with associated means for supplying the hot gas current.

In Fig. 1 the solid line curve represents the composition of boiling aqueous solutions of hydrochloric acid plotted against temperatures, and the broken line curve represents the composition of the vapor in equilibrium therewith. It is seen that both curves rise to a common maximum at a temperature of 108° C. and a composition of 20.2 per cent HCl, at which composition a constant boiling point mixture is produced. The solid line curve also constitutes a boiling point temperature curve for aqueous hydrochloric acid solutions in equilibrium with the saturated vapor thereof at atmospheric pressure. When the solution is more dilute than the constant boiling point mixture, it may be concentrated up to approximately that point by evaporating, in which case the distillate consists mostly of water. On the other hand, stronger solutions than that represented by the constant boiling point mixture upon distillation give off vapors consisting largely of hydrochloric acid gas until the strength of the solution has been reduced to that of the constant boiling point mixture. Continued boiling of such mixture does not result in further concentration or separation of acid and water.

When the distillation of an aqueous hydrochloric acid solution is carried out under fractionating conditions in a suitable column or tower, a substantially complete separation of acid and water in the exit vapors may be secured if proper control is exercised over the temperature within the column and of the vapors leaving the top of the column. In the case where a weak solution is being concentrated, the exit vapor temperature is to be maintained at a maximum of about 100° C., for a saturated vapor, or at a somewhat lower temperature for a hydrochloric acid water vapor mixture diluted with other gases corresponding to the partial pressure of such gases. When a solution of greater strength than that of the constant boiling point mixture is distilled, the temperature of the exit vapors should not exceed about 70° C. in order to deliver a strong acid gas containing only a relatively small amount of water vapor, in which case likewise the presence of diluting gases will necessitate a proportionate lowering of the exit vapor temperature.

In the method of the present invention the heat required for the distillation is supplied by a current of hot gas in direct contact with the acid solution flowing through the fractionating tower or column. Under the simplest mode of procedure, the heating gases pass out through the exit passage together with the distillate, and the mixture of HCl gas and water vapor in such distillate is diluted by the spent heating gases. By an improved mode of procedure, however, the heating gases may be recycled in a closed system to conserve the residual heat content thereof and in such way that when regular operation is once established the heating gases will have approximately the composition of the distillate, as will be hereinafter further explained.

Referring to Fig. 2, 1 represents a vertical column or tower constructed of suitable acid resisting material such as sandstone or the like, which may be in rectangular or other form, as desired. The shaft of the tower 1 is here shown supported upon a base slab 2 having an acid run-off outlet 3 and a trough 4 around the base on the outside to catch leakage which may then be led off through an outlet 5. Within the tower, a grating 6 supports a tower packing 7 composed of acid-proof rings or the like. The tower is closed by a slab or cover 8 through which the aqueous acid to be distilled may be introduced in a suitable manner as by the pipes 9 here shown fitted with valves 10 and spray nozzles 11, the latter being disposed in such relation to the packing as to distribute the aqueous acid with substantial uniformity thereon. A gas inlet 12 is provided near the base of the tower below the grating 6 and an outlet 13 is similarly disposed in the upper portion of the tower above the packing 7.

The hot gas current entering the tower through the inlet 12 passes thence upwardly through the packing and finally out through the outlet 13. The aqueous acid solution supplied through nozzles 11 flows in a multiplicity of small streams through the packing in countercurrent to and in direct and unrestricted heat-exchange contact with the ascending current of hot gas. The gas current is supplied in volume and at a temperature sufficient to furnish the heat required for the distillation, a proper adjustment between the supply of heating gases and rate of flow of fresh acid solution of the tower being made so as to maintain the desired operating conditions. The absence of indirect heating means for boiling the acid solution in a still located below the column, or of means for transmitting heat through a partition wall separating the solution from the heating gases is a vital feature of our improved method. All of the heat required for distillation is provided as sensible heat of the entering gas stream, thereby removing the most serious defects and drawbacks of methods heretofore practiced.

Fig. 3 shows a modified arrangement of apparatus, in which a heating means for the gases is combined directly with the distillation column. Reference characters 1 to 13, inclusive, therein indicate like apparatus elements as in Fig. 2. An acid supply tank 14 is shown connected by a header pipe 15 from which laterals 9 lead to the distributing system in the column. A housing 16 constructed of heat retaining materials such as brick, or the like encloses a furnace 17, a fan 18, a gas circulating blower 19 and a gas heater 20, here shown as a serpentine coil of pipe. Blower 19 is connected by the pipe 21 with the top of column 1 while pipe coil 20 connects with inlet pipe 12 leading to the base of column 1. A by-pass pipe 22 fitted with a damper or valve 23 connects pipes 12 and 21 as shown. A baffle wall, or partition, 24 divides housing 16 into two compartments, 25 and 26, leaving a passage 27 communicating between said compartments. Fan 18 is disposed so as to draw from the compartment 25 at the left of the baffle wall and deliver into compartment 26 at the right. Gaseous, liquid or other fuel is introduced to the furnace 17 through the aperture 28 and the gaseous products of combustion are circulated within the housing as indicated by the arrows, excess combustion gases being vented at 29. The rate of circulation of combustion gases in the housing and the rate of supply of fuel are controlled to maintain the desired temperature of the air bath surrounding the heater 20. In practice the temperature drop at each recurring pass is most advantageously limited to about 10° C., or less.

In operation the hot furnace gases in compartment 26 are employed to heat the circulating gases in coil 20, the latter gases being maintained in motion by blower 19 in the direction indicated by the arrows. The temperature of the circulating gases entering tower 1 at 12 is preferably maintained at about 300° to 325° C. The acid solution to be distilled enters the tower through nozzles 11 and flows downwardly through the packing 7 in countercurrent to the gases, evaporation taking place under fractionating conditions. The rate of flow of heating gases and acid solution is regulated to maintain a suitable vapor temperature at the top of the tower. As previously explained, such temperature may vary from around 40° to 70° C., when a strong acid gas is being distilled over, to around 100° C., when a weak acid solution is being concentrated, or 108° C. when a constant boiling point mixture of hydrochloric acid and water vapor is being distilled at normal atmospheric pressure. A portion of the gases or vapors from the top of the tower sufficient to maintain the circulation of the heating gases is returned through pipe 21 by means of blower 19, reheated in coil 20 and again delivered to the base of the tower through inlet 12. The remaining portion of distillation gases is withdrawn through exit passage 13 to a suitable condensing system not shown.

In commencing operation, the gas passages of the circulating system being filled chiefly with air, such air is heated and conducted to inlet 12 whence it rises through tower 1 and intermixes with the acid and water vapors given off by the distillation. A portion of the air accompanied by some acid and water vapor is recycled through the heating coil, while the remainder issues from the tower mixed with the distillation products. By continued operation, naturally, the original air in the system is eventually completely vented with the exit gases, and the circulating gases then consist of acid gas or water vapor or a mixture thereof corresponding to the distillation product.

For ease and economy of construction, as well as to create the most advantageous conditions for heat transfer in the heating coil, the latter and most of the accessory piping and equipment are to be constructed of iron or steel. Although hydrochloric acid, particularly when mixed with water, is highly corrosive to iron at ordinary temperatures, we have found that if the acid gas, or mixture thereof with water vapor, is maintained at a temperature above about 140° C. and below 325° C., there will be little or no material attack on an iron surface exposed thereto. Such temperature limits comprise roughly the range within which a solution of iron chloride will be evaporated to dryness in the gas current and yet below a temperature whereat any substantial sublimation of iron chloride will occur. It is probable that within the temperature limits approximately as stated a surface film of iron chloride forms which protects the metal from further attack. In the apparatus illustrated in Fig. 3, pipe 21 connecting the top of tower 1 with blower 19 and heater coil 20 is advisedly to be made of acid-resisting material, since moist gases drawn from the top of the tower are at a temperature below 140° C. To protect the other parts of the gas heating apparatus from corrosion, by-pass 22 is provided through which by suitable regulation of valve 23, a sufficient volume of hot gases, e. g. at about 300° C., is by-passed and mixed with the cold gases passing through pipe 21 to raise the temperature of the resulting mixture above 140° C. By such arrangement it becomes practically possible to employ iron or steel for the construction of blower 19 and all of the piping of the heating coil and connections, with exception only of the short pipe section 21.

As just described, we are thus enabled to distill aqueous hydrochloric acid solutions of any strength by a continuous procedure, introducing such solution into the upper part of the fractionating column or tower and withdrawing a solution of approximately constant boiling point composition. i. e. approximately 20 per cent. HCl, from the base of the tower. When the distillation is conducted without recirculation of heating gases as in apparatus illustrated in Fig. 2, the distillate leaving the column is accompanied by the heating gases. In the case where a weak acid solution is to be concentrated to about 20 per cent. strength, such distillate under proper temperature control consists almost entirely of water vapor and the very small acid content thereof may be allowed to pass out through a stack for venting the spent heating gases, or, if desired, may be absorbed in water or an alkaline liquor by passing such spent gases through a suitable scrubber tower.

If an acid solution of more than 20 per cent. strength is to be distilled to produce a strong HCl gas, it is preferable to employ recirculation of the heating gases in an apparatus similar or equivalent to that illustrated in Fig. 3. In such apparatus, after a condition of constant vapor composition has been established, the heating gases will have the same composition as the distillate, which under proper temperature control may consist of a strong acid gas containing 95 per cent. or more HCl. At times a reflux condenser or dephlegmator may advantageously be employed in conjunction with the distilling column for condensing and returning to the column any excess of aqueous vapor which may be entrained with the exit gases. The strong acid gas produced may be employed as such in further operations, as, for example, in dehydrating magnesium chloride, or it may be absorbed in water to produce a pure concentrated acid solution. The 20 per cent. HCl solution discharged from the base of the column, which contains whatever non-volatile impurities were in the original solution, may, if desired, be resaturated with HCl gas, and the fortified solution again subjected to distillation.

When the distillation is carried out simply for the purpose of purifying an aqueous HCl solution, the top of the column is most advantageously, although not necessarily, maintained at the constant boiling point temperature, the distillate then consisting of approximately 20 per cent. HCl. Under such procedure it is advisable not to distill all of the acid solution fed to the column, the rate of feed and of flow of heating gases being so adjusted that a sufficient residual solution to hold substantially all of the non-volatile impurities dissolved therein may be discharged from the base of the column. By so operating the precipitation of solid impurities in the column packing is prevented and consequently danger of obstructing or stopping the interstices and passages in the packing is avoided. By varying the exit vapor temperature, however, a stronger aqueous acid distillate may be produced, but in such case an equivalent amount of 20 per cent. acid solution will be discharged from the base of the column.

By similar procedure solutions of hydrobromic acid may likewise be distilled, making due allowance for the boiling point temperatures of such solutions. The constant boiling point solution contains 44 per cent. HBr and boils at 126° C. Consequently operation with such solutions would be conducted so as to maintain a maximum temperature of 126° C. in the vapor space at the top of the column, when simple distillation is to be carried out, and proportionately lower temperatures for either concentrating weak solutions or distilling off a strong acid gas.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. The method of distilling an aqueous hydrochloric acid solution which comprises flowing a distributed stream thereof countercurrent to and in unrestricted heat-exchange contact with a gaseous current heated initially to a temperature of approximately 300° to 325° C. and regulating the rate of flow of said solution and said gaseous current so that the vapors issuing from the distillation zone are at a temperature between approximately 40° and 110° C. while a residual solution of approximately 20 per cent. hydrochloric acid content flows from said distillation zone.

2. The method of distilling an aqueous hydrochloric acid solution which comprises flowing a distributed stream thereof countercurrent to and in unrestricted heat-exchange contact with a geasous current heated initially to a temperature of approximately 300° to 325° C. and regulating the rate of flow of said solution and said gaseous current so that the vapors issuing from the distillation zone are at a temperature between approximately 40° and 110° C. while a residual solution of approximately 20 per cent. hydrochloric acid content flows from said distillation zone, withdrawing and reheating a portion of the said vapors and returning the reheated vapors to the first step for the hot gaseous current therein.

3. The method of distilling an aqueous hydrochloric acid solution which comprises flowing a distributed stream thereof countercurrent to and in unrestricted heat-exchange contact with a gaseous current heated initially to a temperature of approximately 300° to 325° C. and regulating the rate of flow of said solution and said gaseous current so that the vapors issuing from the distillation zone are at a temperature between approximately 40° and 110° C. while a residual solution of approximately 20 per cent. hydrochloric acid content flows from said distillation zone, withdrawing a portion of said vapors, mixing therewith a portion of said heated gaseous current, which has been by-passed from the main body thereof before the latter is contacted with said solution, so that the temperature of the resultant gaseous mixture is maintained above about 140° C., reheating said mixture to approximately 300° to 325° C. and returning the reheated gases to the first step for the hot gaseous current therein.

4. In a method of distilling an aqueous hydrochloric acid solution, the step which consists in contacting the same under fractionating conditions with a hot gaseous current at a temperature and in volume sufficient to maintain the vapors issuing from the distillation zone at a temperature between 40° and 110° C.

5. In a method of distilling an aqueous hydrochloric acid solution, the step which consists in causing a distributed stream of such solution to flow countercurrent to and in direct contact with a hot gaseous current, the latter being supplied at a temperature and in volume sufficient to maintain the vapors issuing from the distillation zone at a temperature between 40° and 110° C.

6. The method of distilling an aqueous hydrochloric acid solution, which comprises causing a distributed stream of such solution to flow countercurrent to and in direct contact with a hot gaseous current, the latter being supplied at a temperature and in volume sufficient to maintain the vapors issuing from the distillation zone at a temperature between 40° and 110° C., withdrawing a portion of said vapors, reheating the same and returning the reheated vapors to the distillation step for the hot gaseous current therein.

7. The method of distilling a concentrated hydrochloric acid solution to produce a strong hydrochloric acid gas, which comprises flowing a distributed stream thereof countercurrent to and in direct contact with a gaseous current heated initially to a temperature of approximately 300° to 325° C., regulating the rate of flow of said solution and said gaseous current so that the vapors issuing from the distillation zone are at a temperature between approximately 40° and 70° C. and discharging a residual acid solution of approximately 20 per cent strength.

8. The method of distilling a concentrated hydrochloric acid solution to produce a strong hydrochloric acid gas, which comprises flowing a distributed stream thereof countercurrent to and in direct contact with a gaseous current heated initially to a temperature of approximately 300° to 325° C., regulating the rate of flow of said solution and said gaseous current so that the vapors issuing from the distillation zone are at a temperature between approximately 40° and 70° C., discharging a residual acid solution of approximately 20 per cent strength, withdrawing and reheating a portion of said vapors and returning the reheated vapors to the distillation step for the hot gaseous current therein.

9. The method of distilling a concentrated hydrochloric acid solution to produce a strong hydrochloric acid gas, which comprises flowing a distributed stream thereof countercurrent to and in direct contact with a gaseous current heated initially to a temperature of approximately 300° to 325° C., regulating the rate of flow of said solution and said gaseous current so that the vapors issuing from the distillation zone are at a temperature between approximately 40° and 70° C., discharging a residual acid solution of approximately 20 per cent strength, withdrawing a portion of said vapors, mixing therewith a portion of said heated gaseous current, which has been by-passed from the main body thereof before the latter is contacted with said solution, so that the temperature of the resultant gaseous mixture is maintained above about 140° C., reheating said mixture to approximately 300° to 325° C. and returning the reheated gases to the distillation step for the hot gaseous current therein.

10. In a method of distilling an aqueous hydrogen halide solution of the class consisting of hydrobromic acid and hydrochloric acid, the step which consists in contacting such solution under fractionating conditions with a hot gaseous current at a temperature and in volume sufficient to vaporize the same and to maintain the exit vapors from the heating zone at a temperature between about 40° C. and the boiling point of the aqueous acid solution of constant boiling point.

11. In a method of distilling an aqueous hydrogen halide solution of the class consisting of hydrobromic acid and hydrochloric acid, the steps which consist in contacting such solution under fractionating conditions with a hot gaseous current at a temperature and in volume sufficient to vaporize the same and to maintain the exit vapors from the heating zone at a temperature between about 40° C. and the boiling point of the aqueous acid solution of constant boiling point, withdrawing a portion of said vapors, reheating the same and returning the reheated vapors to the distillation step for the hot gaseous current therein.

Signed by us this 11 day of July, 1929.

EDWIN O. BARSTOW.
SHELDON B. HEATH.